(12) United States Patent
Lee

(10) Patent No.: US 7,607,202 B1
(45) Date of Patent: Oct. 27, 2009

(54) HINGE WITH MULTIPLE STRENGTH-ENHANCED RESILIENT FLAT WASHERS

(75) Inventor: Chung-Yu Lee, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 0 days.

(21) Appl. No.: 12/122,675

(22) Filed: May 17, 2008

(51) Int. Cl.
*E05C 17/64* (2006.01)
(52) U.S. Cl. ........................................ 16/342
(58) Field of Classification Search .................. 16/342, 16/374, 337, 386, 387, 329–332; 411/533, 411/544, 546; 361/680–682, 679.27; 248/919–923; 379/433.13; 455/575.3
See application file for complete search history.

(56) References Cited

U.S. PATENT DOCUMENTS

| | | | | |
|---|---|---|---|---|
| 5,896,622 A * | 4/1999 | Lu | ........................ | 16/342 |
| 6,170,120 B1 * | 1/2001 | Lu | ........................ | 16/342 |
| 6,230,365 B1 * | 5/2001 | Lu | ........................ | 16/342 |
| 6,301,748 B1 * | 10/2001 | Su-Man | ........................ | 16/342 |
| 6,321,416 B1 * | 11/2001 | Lu | ........................ | 16/374 |
| 7,124,473 B2 * | 10/2006 | Lu et al. | ........................ | 16/342 |
| 7,257,863 B2 * | 8/2007 | Horng | ........................ | 16/342 |
| 2002/0144378 A1 * | 10/2002 | Liao | ........................ | 16/342 |
| 2007/0094845 A1 * | 5/2007 | Chang et al. | ........................ | 16/342 |
| 2007/0169314 A1 * | 7/2007 | Lee et al. | ........................ | 16/342 |
| 2007/0283534 A1 * | 12/2007 | Chang et al. | ........................ | 16/342 |

* cited by examiner

*Primary Examiner*—William L. Miller
(74) *Attorney, Agent, or Firm*—Pai Patent & Trademark Law Firm; Chao-Chang David Pai

(57) ABSTRACT

A hinge has a stationary leaf, multiple resilient flat washers and a pintle. The stationary leaf has a sleeve. The resilient flat washers are mounted in the sleeve and each resilient flat washer has a ring and a key wing. The ring has a receiving recess formed in a first surface and a mounting rib formed in a second surface. The receiving recess of each resilient flat washer engages the mounting rib of a corresponding resilient flat washer. With the engagements of the receiving recesses and the mounting ribs, the resilient flat washers are connected to each other to enhance the strength of the resilient flat washers. Therefore, the resilient flat washers are strong enough to bear the abrasion for long term use.

19 Claims, 5 Drawing Sheets

HINGE WITH MULTIPLE STRENGTH-ENHANCED RESILIENT FLAT WASHERS

BACKGROUND OF THE INVENTION

1. Field of the Invention

The present invention relates to a hinge, especially to a hinge that is mounted between a cover and a base of an electronic device and has multiple strength-enhanced resilient flat washers.

2. Description of the Prior Arts

Many appliances and electronic devices have a base and a cover, for example notebook computers. A hinge is usually mounted between the base and the cover and pivots to open or close the cover. The conventional hinge has a stationary leaf, multiple resilient flat washers and a pintle. The stationary leaf is attached securely to the base and has a sleeve. The resilient flat washers are mounted securely in the sleeve. The pintle is mounted through the resilient flat washers and is attached securely to the cover. When the cover is pivoted to the base, the pintle is rotated relative to and rubs against the resilient flat washers to provide friction to hold the cover at any desired visual angle.

The resilient flat washers are thin to allow the user slightly adjust the friction easily. However, the thin washers have low strength. The resilient washers are easily broken after the pintle rubs against the resilient washers for a period of time. When some of the resilient washers are broken, the friction that is provided by conventional hinge is reduced and the user may have to replace the conventional hinge. Therefore, the conventional hinge cannot provide a stable friction over long term use.

To overcome the shortcomings, the present invention provides a hinge with multiple strength-enhanced resilient flat washers to mitigate or obviate the aforementioned problems.

SUMMARY OF THE INVENTION

The main objective of the present invention is to provide a hinge with multiple strength-enhanced resilient flat washers. The hinge has a stationary leaf, multiple resilient flat washers and a pintle. The stationary leaf has a sleeve. The resilient flat washers are mounted in the sleeve and each resilient flat washer has a ring and a key wing. The ring has a receiving recess formed in a first surface and a mounting rib formed in a second surface. The receiving recess of each resilient flat washer engages the mounting rib of a corresponding resilient flat washer. With the engagements of the receiving recesses and the mounting ribs, the resilient flat washers are connected to each other to enhance the strength of the resilient flat washers. Therefore, the resilient flat washers are strong enough to bear the abrasion for long term use.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
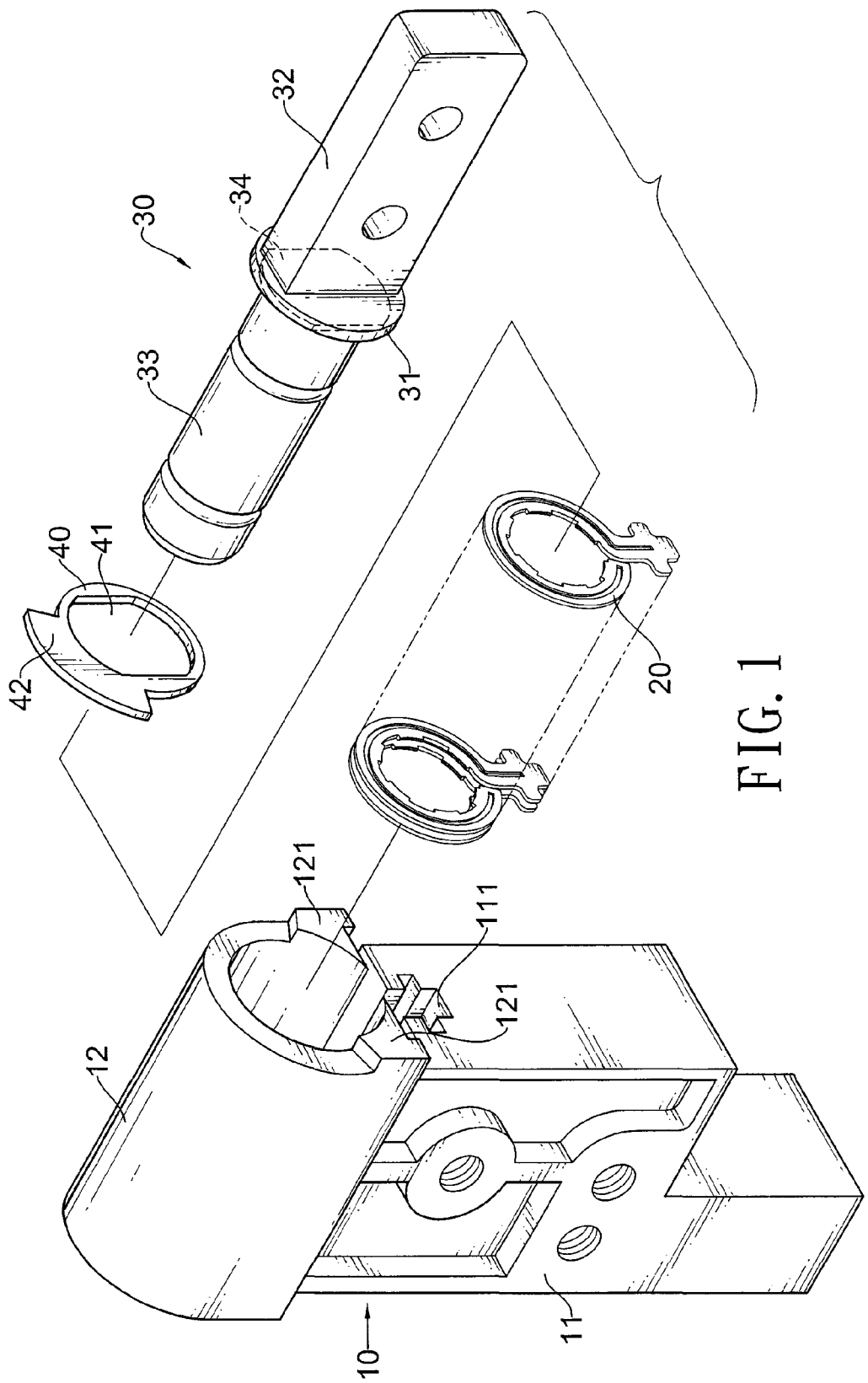
FIG. 1 is an exploded perspective view of a hinge with multiple strength-enhanced resilient flat washers in accordance with the present invention.
Figure 2:
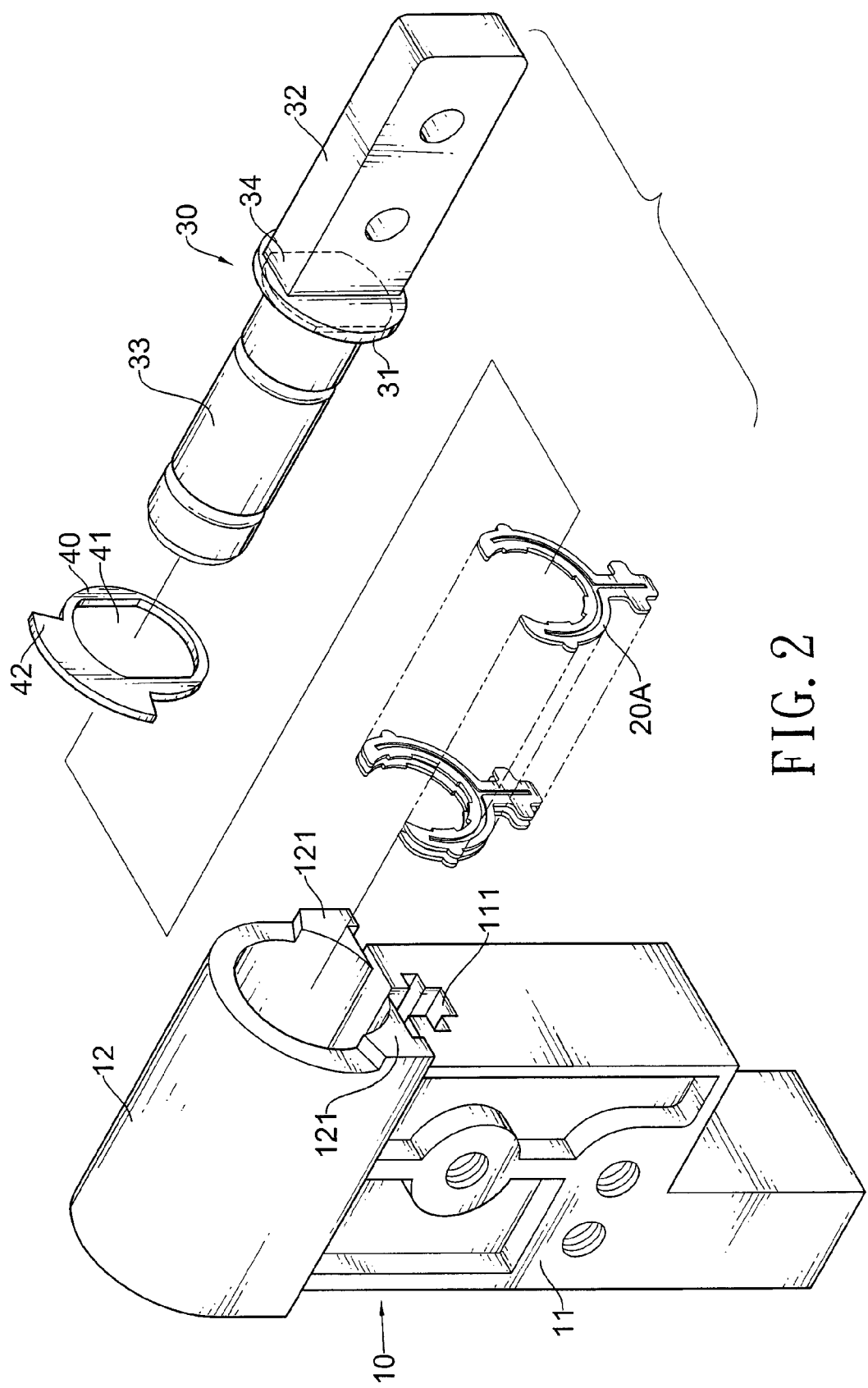
FIG. 2 is an exploded perspective view of another embodiment of a hinge with multiple strength-enhanced resilient flat washers in accordance with the present invention.
Figure 4:
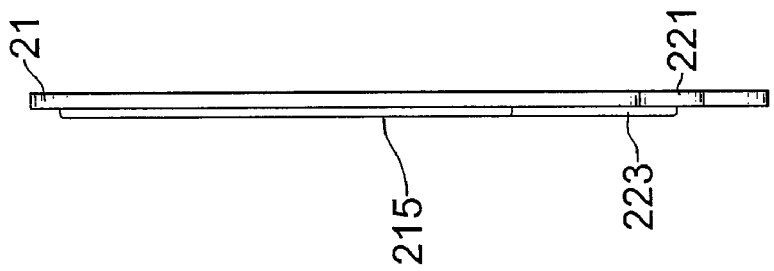
FIG. 4 is a side view of the resilient flat washer in FIG. 3.
Figure 3:
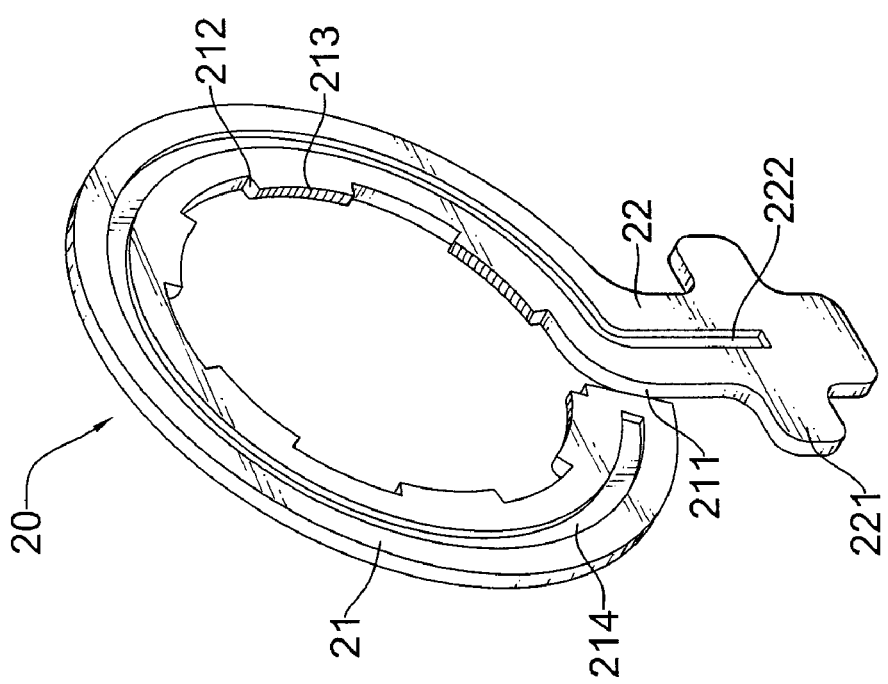
FIG. 3 is an enlarged perspective view of the resilient flat washer in FIG. 1.
Figure 6:
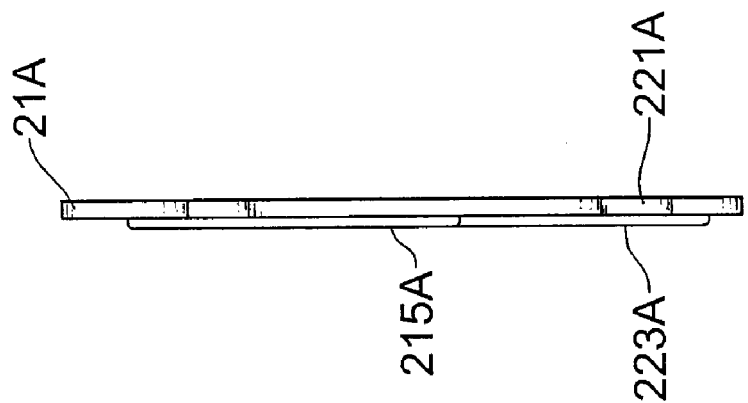
FIG. 6 is a side view of the resilient flat washer in FIG. 5.
Figure 5:
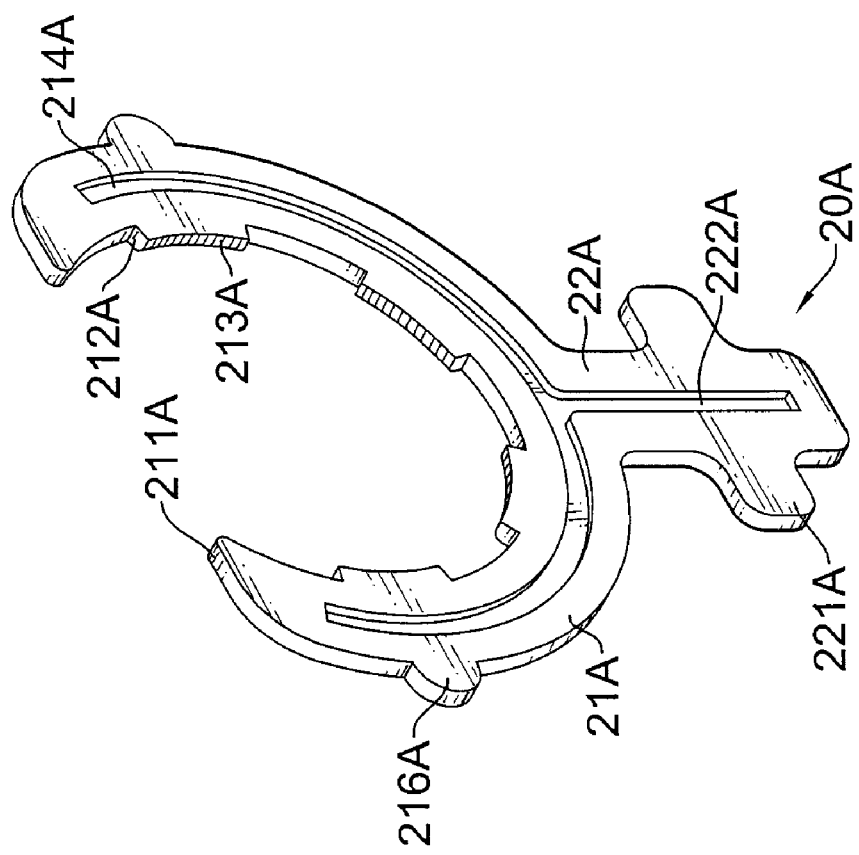
FIG. 5 is an enlarged perspective view of the resilient flat washer in FIG. 2.
Figure 7:
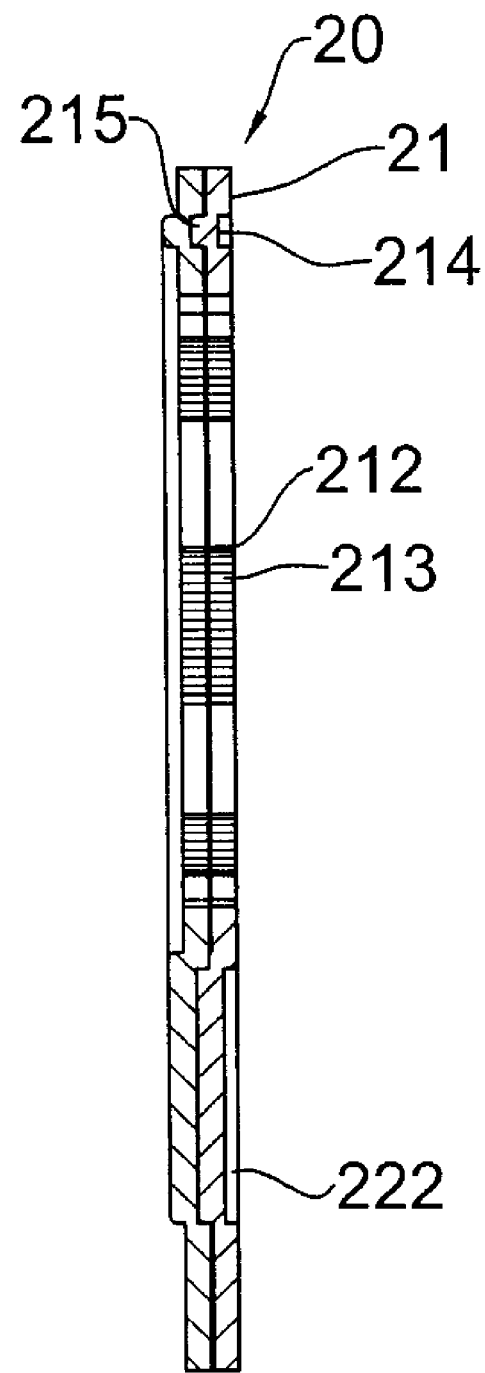
FIG. 7 is an operational side view in partial section of the resilient flat washer in FIG. 3, shown two resilient flat washers attached.

With reference to FIGS. 1 and 2, a hinge with multiple strength-enhanced resilient flat washers in accordance with the present invention comprises a stationary leaf (10), multiple resilient flat washers (20, 20A), a pintle (30) and a limiting spacer (40).

The stationary leaf (10) has a body (11) and a sleeve (12). The body (11) has a side and an elongated keyway (111). The elongated keyway (111) is formed longitudinally in the side of the body (11) and may be a cross in cross section. The sleeve (12) is formed on the side of the body (11), communicates with the elongated keyway (111) and has two limiting stops (121). The limiting stops (121) are formed on and protrude out of opposite sides of the sleeve (12).

With further reference to FIGS. 3 to 7, the resilient flat washers (20, 20A) are mounted in the sleeve (12) and are mounted securely in the body (11). Each resilient flat washer (20, 20A) has a ring (21, 21A) and a key wing (22, 22A).

The ring (21, 21A) is mounted in the sleeve (12) and has a first surface, a second surface, an inner annular edge, an outer annular edge, a gap (211, 211A), multiple abrasion protrusions (212, 212A), a receiving recess (214, 214A), a mounting rib (215, 215A) and multiple tightening knobs (216A). The first and second surfaces are opposite to each other. The gap (211, 211A) is formed through the inner and outer annular edges. The abrasion protrusions (212, 212A) are formed separately on and protrude transversely from the inner annular edge. Each abrasion protrusion (212, 212A) has an outer surface and multiple teeth (213, 213A). The teeth (213, 213A) are formed on the outer surface to enhance friction. The receiving recess (214, 214A) is formed annularly in the first surface. The mounting rib (215, 215A) is formed annularly on the second surface. The receiving recess (214, 214A) of each resilient flat washer (20, 20A) engages the mounting rib (215, 215A) of the corresponding resilient flat washer (20, 20A). The tightening knobs (216A) are formed separately on and protrude transversely out from the outer annular edge and abuts tightly the sleeve (12) to keep the resilient flat washer (20A) from shaking.

The key wing (22, 22A) is formed on and protrudes transversely from the outer annular edge of the ring (21, 21A) and is mounted securely in the keyway (111). The key wing (22) may be adjacent to the gap (211), or the key wing (22A) may be opposite to the gap (211A). The key wing (22, 22A) has a first surface, a second surface, two sides, two keyed protrusions (221, 221A), a receiving recess (222, 222A) and a mounting rib (223, 223A). The first and second sides are opposite to each other. The first surface of the key wing (22, 22A) may correspond to the first surface of the ring (21, 21A). The keyed protrusions (221, 221A) are formed respectively on the sides of the key wing (22, 22A) and engage the elongated keyway (111). The receiving recess (222, 222A) is formed in the first surface of the key wing (22, 22A) of each resilient flat washer (20, 20A) and may communicate with the receiving recess (214, 214A) of the ring (21, 21A) of the resilient flat washer (20, 20A). The mounting rib (223, 223A) is formed on the second surface of the key wing (22, 22A) of each resilient flat washer (20, 20A) and may be connected to the mounting rib (215, 215A) of the ring (21, 21A) of the resilient flat washer (20, 20A). The receiving recess (222, 222A) of the key wing (22, 22A) of each resilient flat washer (20, 20A) engages the mounting rib (223, 223A) of the key wing (22, 22A) of the corresponding resilient flat washer (20, 20A).

The pintle (30) is mounted rotatably in the rings (21, 21A) and may have an enlarged head (31), a securing rod (32), a pivoting rod (33) and a fastening protrusion (34). The enlarged head (31) has an outside surface and an inside surface. The securing rod (32) is formed on the outside surface of the enlarged head (31). The pivoting rod (33) is formed axially on and protrudes out from the inside surface of the enlarged head (31), is mounted rotatably into the rings (21, 21A) of the resilient flat washers (20, 20A). The fastening protrusion (34) is keyed, corresponds to the limiting stops (121) on the sleeve (12) and is formed between the inside surface of the enlarged head (31) and the pivoting rod (33).

The limiting spacer (40) is mounted securely on the pivoting rod of the pintle (30) and has a keyhole (41), an edge and a limiting protrusion (42). The keyhole (41) engages the fastening protrusion (34) of the pintle (30) to mount the limiting spacer (40) securely on the pintle (30). The limiting protrusion (42) is formed transversely on the edge of the limiting spacer (40) and selectively abuts the limiting stops (121) on the sleeve (12) to limit the rotation of the pintle (30).

The hinge as described is mounted between a cover and a base of an electronic device. The body (11) of the stationary leaf (10) is attached securely to the base. The securing rod (32) of the pintle (30) is attached securely to the cover. When the cover is pivoted relative to base, the pintle (30) is rotated relative to the resilient flat washers (20, 20A). Because the engagements between the receiving recesses (214, 214A, 222, 222A) and the mounting ribs (215, 215A, 223, 223A) of the resilient flat washers (20, 20A), the resilient flat washers (20, 20A) are connected securely to each other to enhance the strength of the resilient flat washers (20, 20A). Therefore, the resilient flat washers (20, 20A) are strong enough to bear the abrasion for long term use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
   a stationary leaf having
      a body having
         a side; and
         an elongated keyway being formed longitudinally in the side of the body; and
      a sleeve being formed on the side of the body, communicating with the elongated keyway;
   multiple resilient flat washers being mounted in the sleeve and being mounted securely in the body, and each resilient flat washer having
      a ring being mounted in the sleeve and having
         a first surface;
         a second surface being opposite to the first surface;
         an inner annular edge;
         an outer annular edge;
         a gap being formed through the inner and outer annular edges;
         a receiving recess being formed annularly in the first surface; and
         a mounting rib formed annularly on the second surface, wherein the receiving recess of the ring of each resilient flat washer engages the mounting rib of the ring of a corresponding resilient flat washer; and
      a key wing being formed on and protruding transversely from the outer annular edge of the ring, being mounted securely in the keyway of the stationary leaf and having
         a first surface;
         a second surface being opposite to the first surface of the key wing;
         two sides;
         a receiving recess being formed in the first surface of the key wing; and
         a mounting rib being formed on the second surface of the key wing, wherein the receiving recess of the key wing of each resilient flat washer engages the mounting rib of the key wing of a corresponding resilient flat washer; and
   a pintle being mounted rotatably in the rings of the resilient flat washers.

2. The hinge as claimed in claim 1, wherein
   the first surface of the key wing of each resilient flat washer corresponds to the first surface of the ring of the resilient flat washer;
   the receiving recess of the key wing of each resilient flat washer communicates with the receiving recess of the ring of the resilient flat washer; and
   the mounting rib of the key wing of each resilient flat washer is connected to the mounting rib of the ring of the resilient flat washer.

3. The hinge as claimed in claim 2, wherein the ring of each resilient flat washer further has
   multiple abrasion protrusions being formed separately on and protruding transversely from the inner annular edge of the ring, and each abrasion protrusion having
      an outer surface; and
      multiple teeth being formed on the outer surface of the abrasion protrusion.

4. The hinge as claimed in claim 3, wherein the key wing of each resilient flat washer is adjacent to the gap of the ring of the resilient flat washer.

5. The hinge as claimed in claim 4, wherein
   the elongated keyway of the stationary leaf is a cross in cross section; and
   the key wing of each resilient flat washer has two keyed protrusions being formed respectively on the sides of the key wing and engaging the elongated keyway of the stationary leaf.

6. The hinge as claimed in claim 5, wherein the pintle has
   an enlarged head having an outside surface and an inside surface;
   a securing rod being formed on the outside surface of the enlarged head; and
   a pivoting rod being formed axially on and protruding out from the inside surface of the enlarged head, being mounted rotatably into the rings of the resilient flat washers.

7. The hinge as claimed in claim 6, wherein
the sleeve of the stationary leaf further has two limiting stops being formed on and protruding out of opposite sides of the sleeve; and
the hinge further comprises a limiting spacer being mounted securely on the pivoting rod of the pintle and having
   an edge; and
   a limiting protrusion being formed transversely on the edge of the limiting spacer and selectively abutting the limiting stops on the sleeve.

8. The hinge as claimed in claim 7, wherein
the pintle further has a keyed fastening protrusion corresponding to the limiting stops on the sleeve and being formed between the inside surface of the enlarged head and the pivoting rod; and
the limiting spacer has a keyhole engaging the fastening protrusion of the pintle.

9. The hinge as claimed in claim 3, wherein the key wing of each resilient flat washer is opposite to the gap of the ring of the resilient flat washer.

10. The hinge as claimed in claim 9, wherein the ring of each resilient flat washer further has multiple tightening knobs being formed separately on and protruding transversely out from the outer annular edge and abutting tightly the sleeve.

11. The hinge as claimed in claim 10, wherein
the elongated keyway of the stationary leaf is a cross in cross section; and
the key wing of each resilient flat washer has two keyed protrusions being formed respectively on the sides of the key wing and engaging the elongated keyway of the stationary leaf.

12. The hinge as claimed in claim 11, wherein the pintle has
an enlarged head having an outside surface and an inside surface;
a securing rod being formed on the outside surface of the enlarged head; and
a pivoting rod being formed axially on and protruding out from the inside surface of the enlarged head, being mounted rotatably into the rings of the resilient flat washers.

13. The hinge as claimed in claim 12, wherein
the sleeve of the stationary leaf further has two limiting stops being formed on and protruding out of opposite sides of the sleeve; and
the hinge further comprises a limiting spacer being mounted securely on the pivoting rod of the pintle and having
   an edge; and
   a limiting protrusion being formed transversely on the edge of the limiting spacer and selectively abutting the limiting stops on the sleeve.

14. The hinge as claimed in claim 13, wherein
the pintle further has a keyed fastening protrusion corresponding to the limiting stops on the sleeve and being formed between the inside surface of the enlarged head and the pivoting rod; and
the limiting spacer has a keyhole engaging the fastening protrusion of the pintle.

15. The hinge as claimed in claim 1, wherein the ring of each resilient flat washer further has
multiple abrasion protrusions being formed separately on and protruding transversely from the inner annular edge of the ring, and each abrasion protrusion having
   an outer surface; and
   multiple teeth being formed on the outer surface of the abrasion protrusion.

16. The hinge as claimed in claim 1, wherein the key wing of each resilient flat washer is adjacent to the gap of the ring of the resilient flat washer.

17. The hinge as claimed in claim 1, wherein the key wing of each resilient flat washer is opposite to the gap of the ring of the resilient flat washer.

18. The hinge as claimed in claim 1, wherein
the elongated keyway of the stationary leaf is a cross in cross section; and
the key wing of each resilient flat washer has two keyed protrusions being formed respectively on the sides of the key wing and engaging the elongated keyway of the stationary leaf.

19. The hinge as claimed in claim 1, wherein the pintle has
an enlarged head having an outside surface and an inside surface;
a securing rod being formed on the outside surface of the enlarged head; and
a pivoting rod being formed axially on and protruding out from the inside surface of the enlarged head, being mounted rotatably into the rings of the resilient flat washers.

* * * * *